(12) United States Patent
Heikkilä

(10) Patent No.: US 6,370,049 B1
(45) Date of Patent: Apr. 9, 2002

(54) INVERTER ARRANGEMENT WITH THREE ONE-PHASE AUTOTRANSFORMERS

(75) Inventor: Samuli Heikkilä, Helsinki (FI)

(73) Assignee: ABB Industries Oy, Helsinki (FI)

( * ) Notice: Subject to any disclaimer, the term of this patent is extended or adjusted under 35 U.S.C. 154(b) by 0 days.

(21) Appl. No.: 09/806,995

(22) PCT Filed: Oct. 5, 1999

(86) PCT No.: PCT/FI99/00823

§ 371 Date: Apr. 6, 2001

§ 102(e) Date: Apr. 6, 2001

(87) PCT Pub. No.: WO00/21185

PCT Pub. Date: Apr. 13, 2000

(30) Foreign Application Priority Data

Oct. 7, 1998 (FI) .................................................. 982180

(51) Int. Cl.[7] .................................................. H02M 7/00
(52) U.S. Cl. ........................................................ 363/71
(58) Field of Search ............................. 363/55, 56.01, 363/65, 71, 95, 97, 131

(56) References Cited

U.S. PATENT DOCUMENTS

| 5,008,801 A | | 4/1991 | Glennon | |
|---|---|---|---|---|
| 5,574,356 A | * | 11/1996 | Parker | 323/207 |
| 5,675,484 A | * | 10/1997 | Shimada | 363/71 |
| 6,094,364 A | * | 7/2000 | Eikkila | 363/41 |

FOREIGN PATENT DOCUMENTS

| DE | 3439894 | 4/1986 |
|---|---|---|
| JP | 61-293157 | 12/1986 |

* cited by examiner

*Primary Examiner*—Matthew Nguyen
(74) *Attorney, Agent, or Firm*—Dykema Gossett PLLC

(57) ABSTRACT

An inverter arrangement which comprises two inverter units which comprise an intermediate voltage circuit and phase-specific switch components. The inverter arrangement also comprises phase-specific one-phase autotransformers, the first poles of which are connected to the phase-specific outputs of the first inverter unit and the second poles to the phase-specific outputs of the second inverter unit, and thus the output voltage of the inverter is obtained from the third poles of the autotransformers.

2 Claims, 2 Drawing Sheets

INVERTER ARRANGEMENT WITH THREE ONE-PHASE AUTOTRANSFORMERS

BACKGROUND OF THE INVENTION

The invention relates to an inverter arrangement which comprises two inverter units which comprise an intermediate voltage circuit and phase-specific switch components.

In modern electric motor driven devices inverters are commonly used because of the properties achieved by them, such as good efficiency and accurate controllability of the motor. Inverters provided with intermediate voltage circuits generate short direct voltage pulses which are used as the input voltage of the motor and whose pulse width is changed when needed. By the existing modulation methods the switches of inverters can be controlled so that the desired rotation speed and torque of the motor can be maintained in sudden changes and the full torque can be generated even at zero speed.

The length of the motor cables between the inverter and the motor causes problems as the voltage drops in the cables. Thus the poles of the motor cannot be provided with a voltage as high as that in the output of the inverter. Earlier the problem has been solved e.g. by using a high-voltage motor and a step-up transformer in the output of the inverter. Use of a step-up transformer solves the problem of voltage loss, but causes several other problems which impair the properties and controllability of motor driven devices. Due to the step-up transformer the drive used cannot be DC-magnetized or DC-braked. Furthermore, it is in practice impossible to operate the drive at low speeds.

Inductance of the secondary circuit in the step-up transformer forms LC oscillating circuits with the motor cables and the stray capacitance of the transformer. To attenuate the resonance of the oscillating circuits it is necessary to use a separate attenuator, or the modulation component of the switches of the inverter at the same resonance frequency has to be filtered off using a separate LC low-pass filter. The LC filter makes use of modulation methods based on measuring the motor current impossible because, due to the capacitive currents of, the LC filter, the output current of the inverter is not of the same magnitude as the motor current.

The lower the speed is at which the full-load torque is to be obtained from the motor, the greater the voltage increase of the step-up transformer used has to be. In practice the voltage increase must be greater than in conventional transformers because a certain saturation margin has too be reserved for the transformer. Due to saturation margin the transformer must be larger, which in turn increases the costs.

BRIEF DESCRIPTION OF THE INVENTION

The object of this invention is to provide an arrangement to eliminate the above-mentioned disadvantages and to control the motor even in connection with long cables reliably employing all the modulation techniques used for short cables. This object is achieved by means of the arrangement of the invention which is characterized in that the arrangement also comprises phase-specific one-phase autotransformers the first poles of which are connected to the phase-specific outputs of the first inverter unit and the second poles to the phase-specific outputs of the second inverter unit, and thus the output voltage of the inverter is obtained from the third poles of the autotransformers.

The invention is based on the idea that one-phase autotransformers are used for boosting the output voltage of the inverter, and the two poles of the autotransformers are controlled by two different inverter units while the third pole of the autotransformer generates the output voltage of the inverter. When this arrangement is used, the transformer will not cause resonance problems which would need to be resolved using a separate LC low-pass filter, and thus all properties of a modern inverter can be utilized. Furthermore, autotransformers are considerably smaller than three-phase transformers conventionally used in voltage boosting. Thanks to this, the arrangement of the invention allows to reduce material costs considerably and save space.

In addition to all normal properties of the inverter, such as DC-magnetization an DC-braking, the arrangement of the invention offers new alternative ways of controlling a motor because it allows generation of several different voltage levels which can be connected to the motor in the desired manner. Thanks to the arrangement, the motor can also be controlled with the full torque starting from the zero speed, which has been impossible in prior art step-up transformers.

BRIEF DESCRIPTION OF THE DRAWINGS

The invention will be described in greater detail by means of preferred embodiments with reference to the accompanying drawings, in which FIG. 1 schematically illustrates an arrangement employing the prior art for boosting the output voltage of an inverter.

DETAILED DESCRIPTION OF THE INVENTION

Figure 1:
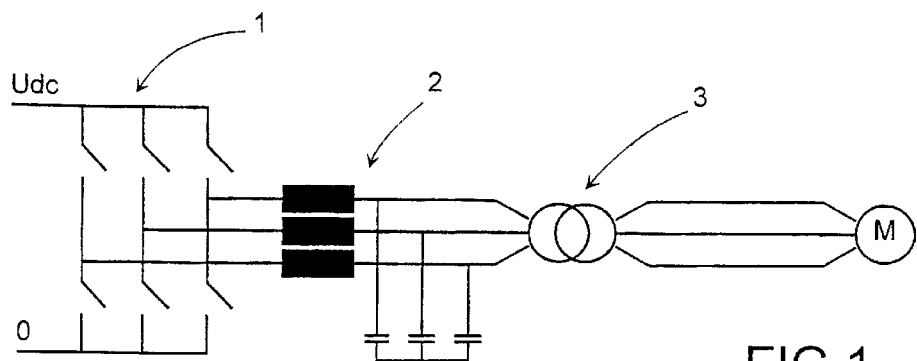

The arrangement of FIG. 1 utilizes the prior art because long motor cables cause a voltage drop, i.e. a transformer 3 is used for boosting the output voltage obtained from the inverter 1. Because of the resonance circuit formed by the inductance and capacitance of the transformer and motor cables, a low-pass filter 2 is also connected between the inverter 1 and the transformer 3, the low-pass filter being arranged to filter off components having the same frequency as the natural frequency of the resonance circuit from the output voltage of the inverter.

Figure 2:
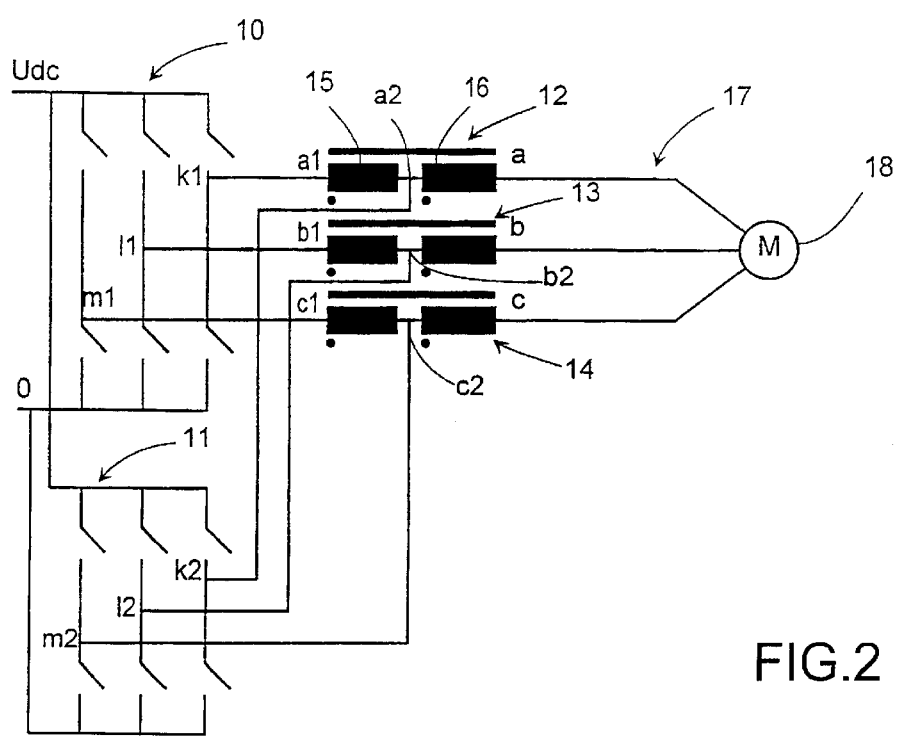
FIG. 2 schematically illustrates an inverter arrangement according to a preferred embodiment of the invention.

FIG. 2 schematically illustrates an inverter arrangement according to a preferred embodiment of the invention. The arrangement comprises two inverter units 10, 11 the intermediate voltage circuits of which are connected in parallel with each other. The inverter units typically comprise one switch pair per each output phase. Thanks to the switch pair, an upper and a lower voltage level can be alternately connected to the output of the inverter unit. The inverter units may also be separate according to the invention, i.e. both units have their own intermediate voltage circuits and rectifiers connected to them. In the arrangement according to a preferred embodiment of the invention the inverter units use the direct voltage of a common intermediate voltage circuit, and thus only one rectifier is needed in the arrangement.

The inverter arrangement of the invention comprises phase-specific one-phase transformers 12, 13, 14 which are connected like autotransformers, as illustrated in FIG. 2. An autotransformer refers to a transformer in which the primary and the secondary circuit of the transformer are formed from the same coil. In an autotransformer the whole coil typically forms the primary circuit and a section of the same coil the secondary circuit. In the arrangement the coils of the transformer are controlled so that the phase-specific outputs k1, l1, m1 of the first inverter unit 10 are connected to the first poles a1, b1, c1 of the autotransformers and the phase-specific outputs k2, l2, m2 of the second inverter unit 11 to the second poles a2, b2, c2 of the autotransformers. In that case a section 15 of the transformer coil 12, for example, is connected between the outputs of the inverter units.

The output voltage provided by the arrangement of the invention is obtained from the third poles a, b, c of the transformers 12, 13, 14, which are directly connected to the load to be controlled through a motor cable 17. In the embodiment of FIG. 2 the motor M is used as the load. The phase voltages are generated for the load by controlling the switch components of the inverter units in an appropriate order. The momentary values of the phase voltage of the load may receive four different values which are determined by the combination of the switch positions of the inverter units. When the transformation ratio of the transformers is K, the phase voltage Ua of phase a, for example, may receive the values given in the following table depending on the switch positions of a phases of the inverter units (the negative busbar of the intermediate voltage circuit corresponds to zero potential).

| Ua1 | Ua2 | Ua |
|-----|-----|----|
| 0   | 0   | 0  |
| 0   | Udc | Udc+k*Udc |
| Udc | 0   | −k*Udc |
| Udc | Udc | Udc |

In the table voltages Ua1 and Ua2 represent the voltage of the first a1 and the second a2 pole of the coil 15. The voltage may receive values 0 and Udc which are the voltages of the positive and the negative terminal of the intermediate circuit.

When the transformation ratio K of the transformers is considerably greater than one, a situation is achieved where there are in practice three possible phase voltage levels. In that case the number of available output voltage vectors is 18 instead of the usual six in the conventional two-level inverter. The three-phase system can be described by means of one rotating phasor. This phasor has thus 18 possible states which are dependent on the positions of the switches of the inverter units.

Figure 4:
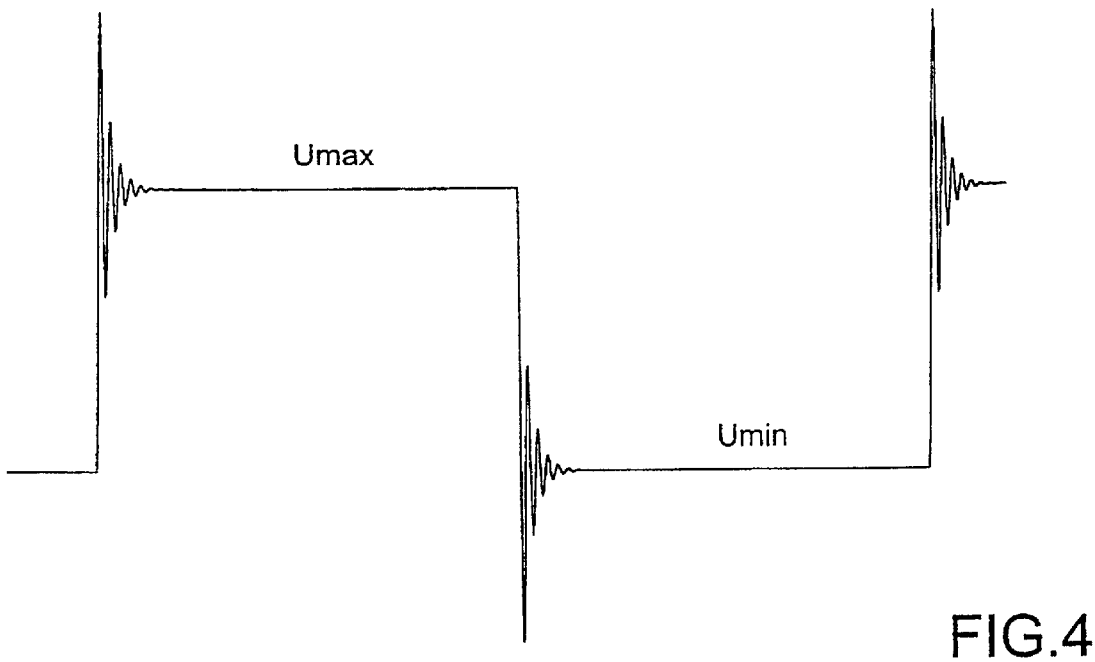
FIG. 4 illustrates the curve shape of the output voltage when a conventional step-up transformer is used.

When K is high, two out of four possible voltage values differ considerably from the two other values. The values the magnitude of which differs significantly are Udc+K*Udc and −K*Udc. The voltage difference between Udc and 0 can be deemed insignificant compared to the other two voltage values. Since in practice there are three possible phase voltage levels, the main voltage obtained for the load will have five levels. In the case of the five-level main voltage, LC oscillation caused by one voltage step supplied to the machine is four times weaker than in a three-phase transformer. Consequently, the inverter arrangement of the invention does not require any separate filter for attenuating oscillation. FIG. 4 illustrates the curve shape of the output voltage obtained by utilizing the prior art. Each change of the output voltage shows considerable ripple of the voltage.

Figure 5:
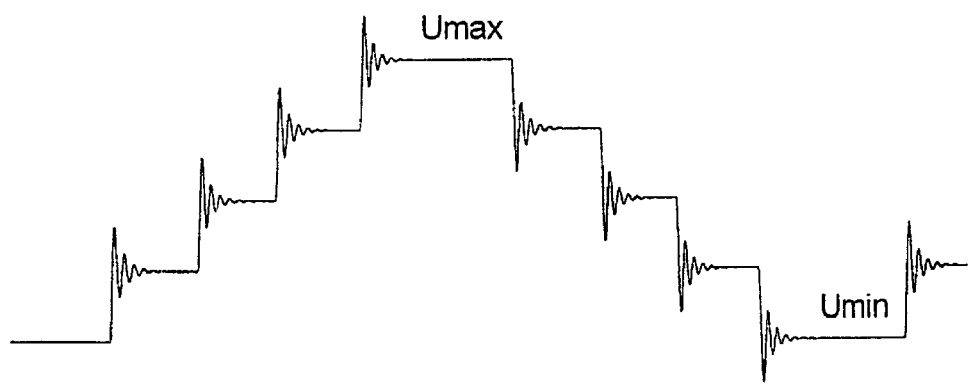
FIG. 5 illustrates the curve shape of the output voltage when the arrangement of the invention is used.

Voltage overshoot may increase further if two or more state changes of the switches are temporally close to one another so that the oscillation caused by the preceding state change has not been completely attenuated before the next change. FIG. 5 illustrates a multi-level voltage achieved with the arrangement of the invention and voltage oscillation caused by it. Overshoot is considerably smaller in the output voltage due to smaller voltage changes. Voltages Umax, Umin of the curve shapes of FIGS. 4 and 5 correspond to each other, and consequently overshoots in the figures are also comparable in magnitude. In addition, as a result of the size of the voltage step to be connected, the extent of ripple of the current of the motor cable and motor is small when the arrangement of the invention is used.

If the value of the transformation ratio K is kept small, e.g. below five, the phase voltage will in practice have 4 levels and the main voltage 7 levels. It that case the number of different source voltage vectors will be 48. By using low transformation ratios, LC oscillation and ripple of the current can be reduced further.

As can be seen in the table above, the first coil of the transformer is short-circuited when the switches of the same phase of the inverter units are in the same potential (0,0 or Udc, Udc). In that case the output voltage of the phase in question corresponds to the potential of the output voltages of the inverter unit. However, the transformer flux does not change, and thus, as regards the transformer, the above-mentioned switch positions can be maintained for an arbitrary period. Consequently it is possible to change over to normal modulation below a certain frequency and supply only pulses of the same magnitude as the intermediate circuit voltage to the machine. Below a certain frequency limit it is not useful to supply voltage pulses higher than the intermediate circuit voltage because in normal use the rotation speed of the short-circuit motor is controlled by increasing the supply frequency and the supply voltage in the same proportion.

When pulses having the same magnitude as the intermediate circuit voltage are supplied to a load machine, all normal modulation methods of a two-phase inverter can be used, including DC-magnetization and DC-braking. When the frequency to be obtained from the inverter increases so that it corresponds to the field weakening point corresponding to the intermediate circuit voltage, the transformers are activated by changing the switch positions of the inverter units so that they are momentarily different, and thus voltage pulses in accordance with the transformation ratio are generated in the poles of the load.

Figure 3:
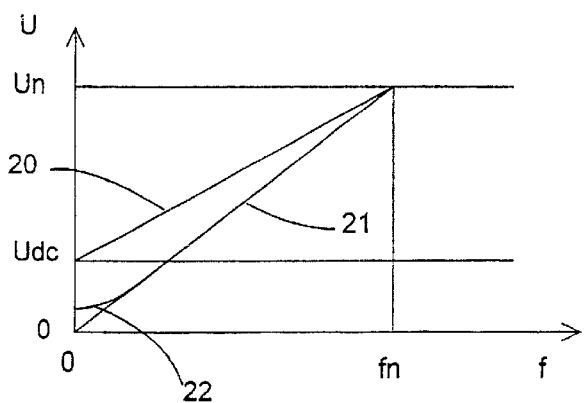
FIG. 3 illustrates the maximum output voltages achieved with the arrangement of the invention and the prior art arrangement as a function of frequency.

FIG. 3 shows, as a function of output frequency, the maximum value 21 of the output voltage achieved with a conventional step-up transformer and the maximum value 20 of the output voltage achieved with the arrangement of the invention compared to the voltage-frequency (U/f) curve 22 of a typical load machine. The output voltage of a normal three-phase step-up transformer is zero volts at zero frequency and increases linearly as a function of frequency, as is illustrated by graph 21 in FIG. 3. The frequency at which it reaches the U/f curve of the machine is the minimum frequency at which the drive can be operated. The minimum frequency can be reduced by increasing the transformer flux, i.e. by increasing the slope of the U/f curve of the transformer. However, function with DC voltage is always theoretically impossible.

When the one-phase transformer coupling of the invention is used, the graph 20 of the achievable maximum output voltage is above the U/f curve in the whole area of standard flux, which allows to operate the machine at all operating points. The standard flux area refers to a frequency area where the rotation speed of the motor is controlled by increasing the motor voltage in the same proportion with the frequency. The standard flux area ends at a field weakening point where the nominal speed fn and voltage Un of the machine are achieved. The only limitation to operation at all operating points is that the magnitude Udc of the intermediate circuit voltage should be sufficient for compensating for the resistive losses of the machine and the transformer at zero frequency. The resistive losses of the machine are considerable at low frequencies compared to the inductive losses of the machine. Therefore the first part of the U/f graph of the machine is not linear.

Since the momentary voltage of the machine used as the load as well as the momentary current supplied to the machine are always known when one-phase transformers are used according to the invention, all properties provided by the modulation techniques, such as speed starts of the machine on the basis of momentary values of the current, are applicable in the arrangement. Thanks to the arrangement, there is no need for additional filters for attenuating oscillation because the amplitude of oscillation decreases as the output voltage levels increase.

The inverter arrangement of the invention requires two inverter units, and the sum of the nominal currents of these units must correspond to the nominal current of one inverter unit implemented using the conventional technology. Thus structure of the inverters used in the arrangement of the invention can be light. However, in typical devices which require voltage boosting two inverter units are used in parallel, so the two units required by the arrangement are used in any case.

The mass of the one-phase transformers used in the arrangement of the invention is in practice smaller than the combined mass of the three-phase transformer used for voltage boosting in the conventional arrangement and the inductor of the LC filter. When the transformation ratio is reduced, the one-phase transformers can be smaller because only the voltage exceeding the intermediate circuit voltage Udc is generated by the transformer.

It is obvious to a person skilled in the art that the inventive concept can be implemented in various ways. The invention and its embodiments are not limited to the examples described above, but they may vary within the scope of the claims.

What is claimed is:

1. An inverter arrangement which comprises first and second inverter units having phase specific outputs comprising: an intermediate voltage circuit and phase-specific switch components, including phase-specific one-phase auto transformers and first poles being connected to the phase-specific outputs of the first inverter unit and second poles to the phase-specific outputs of the second inverter unit, and output voltage of the inverter being obtained from third poles of the autotransformers.

2. An arrangement according to claim 1 wherein the intermediate voltage circuits of the inverter units are connected in parallel.

* * * * *

UNITED STATES PATENT AND TRADEMARK OFFICE
CERTIFICATE OF CORRECTION

PATENT NO. : 6,370,049 B1
DATED : April 9, 2002
INVENTOR(S) : Heikkilä

It is certified that error appears in the above-identified patent and that said Letters Patent is hereby corrected as shown below:

<u>Title page,</u>
Items [12] and [75], the last name of the inventor should read -- Heikkilä --
Item [73], Assignee, should read -- ABB Industry Oy --

Signed and Sealed this

Twentieth Day of May, 2003

JAMES E. ROGAN
*Director of the United States Patent and Trademark Office*